Patented Apr. 23, 1935

1,998,583

UNITED STATES PATENT OFFICE 1,998,583

INORGANIC ACID ESTERS OF THE CONDENSATION PRODUCTS OF A GLYCOL AND CHLORINATED PARAFFIN HYDROCARBONS

Karl Keller, Frankfort-on-the-Main-Fechenheim, Heinrich Hopff, Ludwigshafen-on-the-Rhine, Eduard Gofferjé, Frankfort-on-the-Main, and Joseph Nuesslein, Ludwigshafen-on-the-Rhine, Germany, assignors to I. G. Farbenindustrie Aktiengesellschaft, Frankfort-on-the-Main, Germany No Drawing. Application January 21, 1931, Serial No. 510,275. In Germany January 27, 1930

8 Claims. (Cl. 260—99.12)

The present invention relates to the production of assistants for the textile and related industries.

We have found that valuable products which are suitable for example as impregnating, dissolving, wetting, cleansing, tanning, softening, emulsifying, dispersing and like agents, are obtained by acting on saturated organic compounds containing halogenated long aliphatic chains (with at least 5 carbon atoms) or mixtures mainly consisting of these compounds, with alcohols, i. e. with mono- or polyhydric aliphatic or cycloaliphatic alcohols, phenols or naphthols or derivatives of the polyhydric alcohols containing at least one reactive hydroxylic hydrogen atom, and if desired causing strong organic or inorganic non-oxidizing acids, or derivatives of such acids chemically reacting like the free acids, to react simultaneously or subsequently with the ethers obtained, with the formation of esters if the ethers still contain free hydroxyl groups or with the formation of sulphonic acids.

As examples of initial materials may be mentioned halogen derivatives of hydrocarbons containing halogenated long aliphatic chains, or of mixtures or derivatives of the same, as for example halogenated products from halogenating the different petroleum fractions (benzines, illuminating oil, ligroins, lubricating oils, paraffin oils, solid paraffins and their oxidation products containing acids, alcohols and similar oxygenated compounds) or the products from the liquefaction of coal, brown coal tar oils and the like or Montan wax, fatty acids, such as the acids of vegetable or animal fats or oils, higher alcohols as for example decyl or dodecyl alcohols and ketones as for example di-amyl ketone or still higher ketones. Organic compounds which, in addition to the halogenated long aliphatic chains, contain aromatic, hydroaromatic or heterocyclic radicles are also suitable. The preparation of the halogen-containing organic compounds may be carried out according to methods already known, as for example by the direct action of halogens on the said organic compounds while heating.

The treatment of the halogen compounds with the aliphatic alcohols, phenols, or naphthols, may be carried out in the presence or absence of organic solvents or diluents such as benzine, chlorbenzene, nitrobenzene, ligroin, tetrachlorethane or cyclohexanone if desired at a pressure above atmospheric pressure and, preferably, in the presence of a condensing agent capable of splitting off halogen hydracids such as metallic copper and salts of copper, aluminium chloride, zinc chloride or alkaline agents as for example soda, caustic soda, sodium acetate, pyridine, dimethylaniline and the like.

In so far as the resulting reaction products contain free hydroxyl groups they may be subsequently converted into esters with aliphatic, cycloaliphatic or aromatic carboxylic acids such as oxalic, acetic, lactic or like acids or with strong polybasic mineral acids such as phosphoric or sulphuric acids. When compounds are formed which are capable of forming salts, they may be converted into their ammonia or alkali metal salts and used for the purposes hereinbefore specified. In cases when employing sulphuric acid, or an agent furnishing the same, the process may be carried out so that the sulphur atom is not combined in the form of sulphuric ester, but that the sulphur atom is directly combined with a carbon atom, so that true sulphonic acids are formed as can be obtained on working with sulphur trioxide or like strong sulphonating agents if desired in the presence of inert solvents such as carbon tetrachloride.

The resulting products may be employed for a great variety of purposes and frequently have a good wetting, washing and emulsifying action, but generally speaking they have a whole series of advantages which soaps do not have, as for example high stability to acids, insensitiveness to alkaline earth salts and the like, so that, contrasted with soaps, their field of employment is considerably extended. They are suitable for example for the production of preparations for the treatment of textiles as for example oil emulsions for spinning or impregnating, but they are also useful as assistants in the production of drilling greases as drilling oils and for greasing leather. They may be used as substitutes for fats, oils and mineral oils, they are suitable as levelling agents in the dyeing of materials of all kinds, for the preparation of very finely divided pigments and the like. The resulting acid esters as well as the free acids and salts are excellent washing and cleansing agents even for acid liquors, the amines and ethers being valuable solvents and dispersing agents.

The following examples will further illustrate the nature of this invention, but the invention is not restricted to these examples. The parts are by weight.

*Example 1*

Chlorine is led into 200 parts of an American illuminating petroleum (boiling point from 150° to 300° C.) at from 60° to 70° C. until an increase in weight of about 50 parts has taken place. Hydrogen chloride formed is then removed by passing a powerful current of air through the reaction product. 23 parts of sodium metal are then dissolved in 300 parts of ethylene glycol and the resulting solution is added to the chlorinated petroleum prepared as hereinbefore described. The whole is then boiled until the separation of sodium chloride is completed and the remainders of the glycol are then distilled off in vacuo. A viscous oil is obtained which may be converted into the acid sulphuric ester by treatment with 100 parts of chlorosulphonic acid at from 40° to 50° C.

The sulphonated compounds thus obtained and the salts thereof dissolve readily in water and yield strongly foaming solutions which have an excellent cleansing action. They are good wetting and dispersing agents and may be employed with advantage for the preparation of stable emulsions for the impregnating industry, as additions to carbonizing baths and for similar purposes in the textile industry. If the oil obtained after distilling off the remainders of the glycol be treated with phosphorus pentoxide instead of with chlorosulphonic acid, an acid phosphoric ester is obtained which may be employed for the same purposes either as such or in the form of its salts.

*Example 2*

200 parts of a middle oil having a boiling point of from 200° to 310° C. obtained by the destructive hydrogenation of brown coal is chlorinated as described in Example 1 until an increase in weight of 100 parts has taken place and the remainders of chlorine and the dissolved hydrogen chloride are removed by blowing through air. The product is then heated with 115 parts of sodium phenolate at 200° C. until the separation of common salt has ceased. The phenyl ether obtained is a good lubricating agent and solvent. By heating with 500 parts of fuming sulphuric acid to from 100° to 120° C. it is converted into a water-soluble sulphonic acid which is suitable as a cleansing and dispersing agent either as such or in the form of its alkali salts.

If 165 parts of sodium β-naphtholate or 135 parts of sodium resorsinolate are employed instead of the sodium phenolate, products are obtained the sulphonic acids of which have an even greater cleansing action. The same is true to a still greater extent of those products which are prepared with the employment of alkylated naphthols, as for example dibutyl naphthol.

It is not essential to use the phenolates. The halogen compounds may also be boiled with free phenols, naphthols and the like until the evolution of hydrogen chloride has ceased.

We claim:—

1. An ether mixture, suitable as an assistant in the textile and allied industries, in which an aliphatic alcohol containing up to 2 hydroxyl groups is etherified with a mixture of several homologous aliphatic alcohols, containing up to 2 hydroxyl groups and an aliphatic chain with at least 5 carbon atoms, said ether mixture resulting from the treatment of a homologous mixture of chlorinated hydrocarbon materials with said aliphatic alcohol.

2. An ether mixture, suitable as an assistant in the textile and allied industries, resulting from the condensation of an aliphatic alcohol containing up to 2 hydroxyl groups with a homologous mixture of saturated hydrocarbons consisting essentially of hydrocarbons having chlorinated aliphatic chains of at least 5 carbon atoms, the normally free hydroxyl groups of the ethers being esterified by a strong polybasic mineral acid selected from the group consisting of sulphuric and phosphoric acids.

3. An ether mixture, suitable as an assistant in the textile and allied industries, in which a glycol is etherified with a mixture of several homologous aliphatic alcohols, containing up to 2 hydroxyl groups and an aliphatic chain with at least 5 carbon atoms, said ether mixture resulting from the treatment of a homologous mixture of chlorinated hydrocarbon materials with said glycol.

4. An ether mixture, suitable as an assistant in the textile and allied industries, resulting from the condensation of a glycol with a homologous mixture of saturated hydrocarbons consisting essentially of hydrocarbons having chlorinated aliphatic chains of at least 5 carbon atoms, the normally free hydroxyl groups of the ethers being esterified by a strong polybasic mineral acid selected from the group consisting of sulphuric and phosphoric acids.

5. An ether mixture, suitable as an assistant in the textile and allied industries, in which ethylene glycol is etherified with a mixture of several homologous aliphatic alcohols, containing up to 2 hydroxyl groups and an aliphatic chain with at least 5 carbon atoms, said ether mixture resulting from the treatment of a homologous mixture of chlorinated hydrocarbon materials with said glycol.

6. An ether mixture, suitable as an assistant in the textile and allied industries, resulting from the condensation of ethylene glycol with a homologous mixture of saturated hydrocarbons consisting essentially of hydrocarbons having chlorinated aliphatic chains of at least 5 carbon atoms, the normally free hydroxyl groups of the ethers being esterified by a strong polybasic mineral acid selected from the group consisting of sulphuric and phosphoric acids.

7. An ether mixture, suitable as an assistant in the textile and allied industries, in which ethylene glycol is etherified with a mixture of several homologous aliphatic alcohols said mixture resulting from the treatment of chlorinated paraffin with said glycol.

8. An ether mixture, suitable as an assistant in the textile and allied industries, resulting from the condensation of ethylene glycol with chlorinated paraffin, the normally free hydroxyl groups of the ethers being esterified by sulphuric acid.

KARL KELLER.
HEINRICH HOPFF.
EDUARD GOFFERJÉ.
JOSEPH NUESSLEIN.